Figure 1:
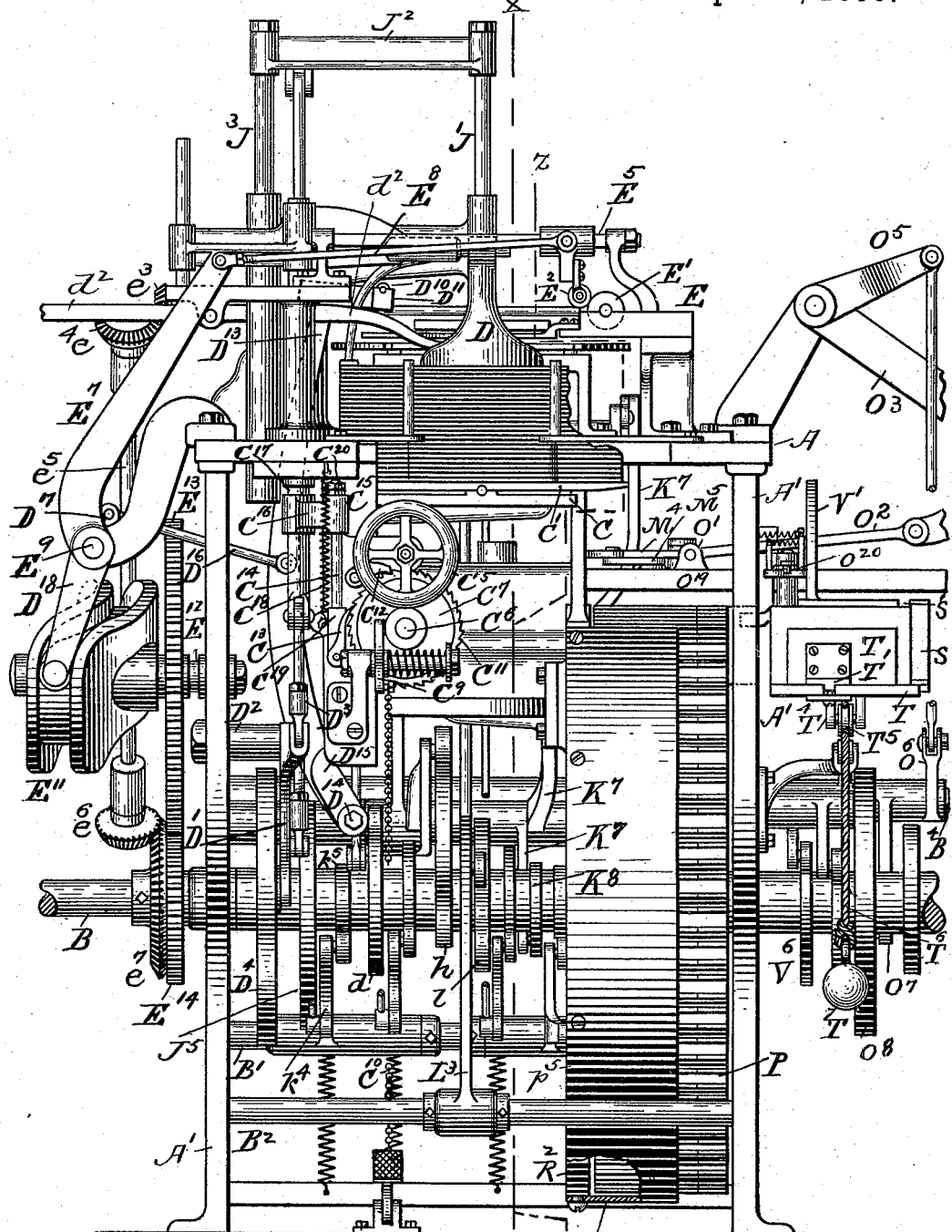

(No Model.) 13 Sheets—Sheet 1.

J. DENNIS, W. S. METCALFE & J. A. SHERMAN.
ENVELOP MACHINE.

No. 558,784. Patented Apr. 21, 1896.

WITNESSES
INVENTORS (No Model.) 13 Sheets—Sheet 7.

J. DENNIS, W. S. METCALFE & J. A. SHERMAN.
ENVELOP MACHINE.

No. 558,784. Patented Apr. 21, 1896.

WITNESSES.
C. Herbert Colburn
B. F. Southwick

INVENTORS.
Joseph Dennis
John A. Sherman
Wm. S. Metcalfe

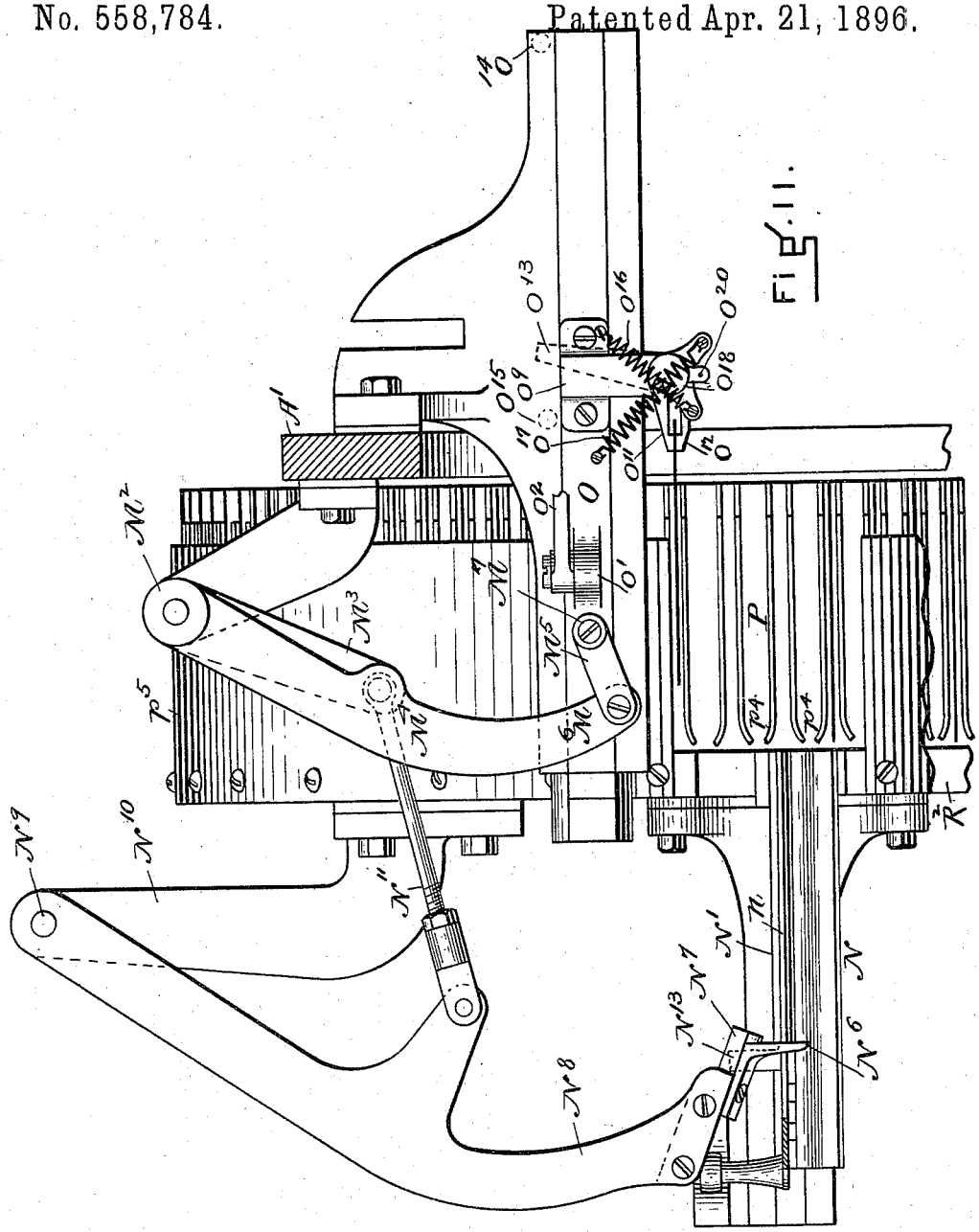

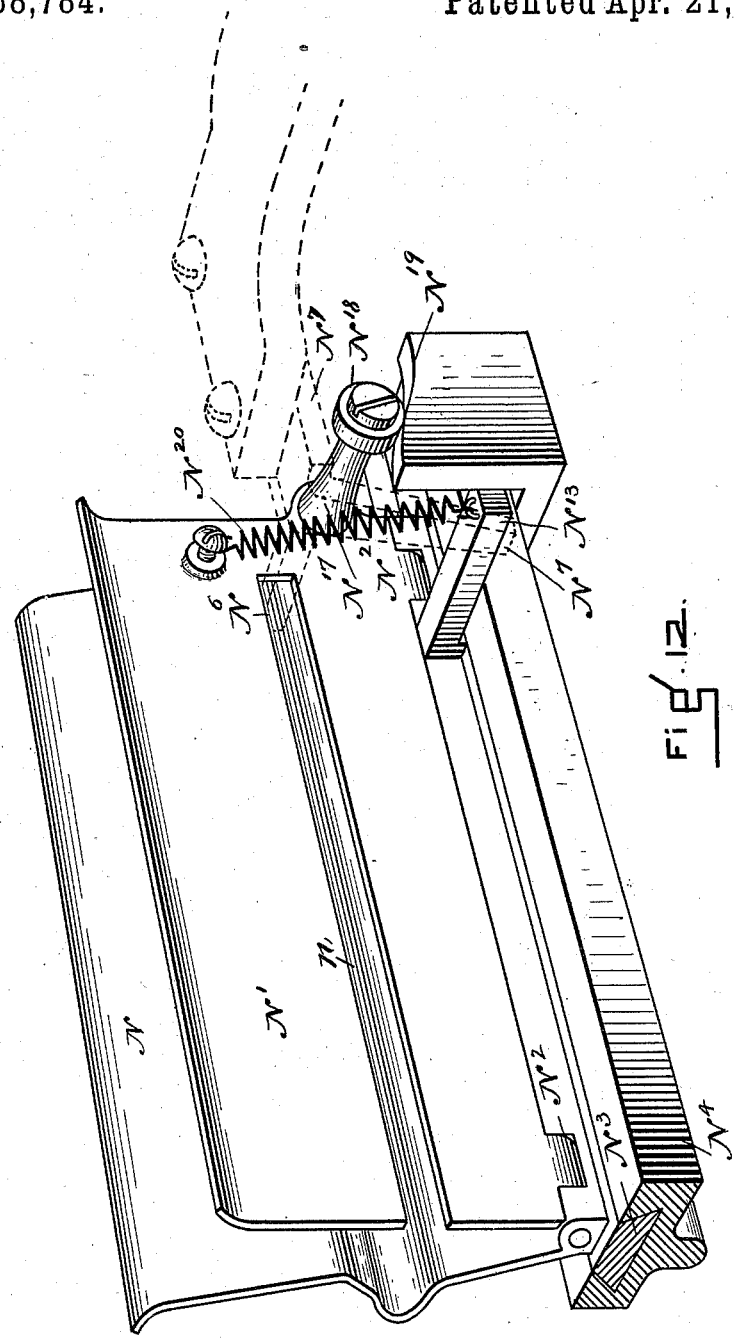

(No Model.) 13 Sheets—Sheet 10.
J. DENNIS, W. S. METCALFE & J. A. SHERMAN.
ENVELOP MACHINE.
No. 558,784. Patented Apr. 21, 1896.
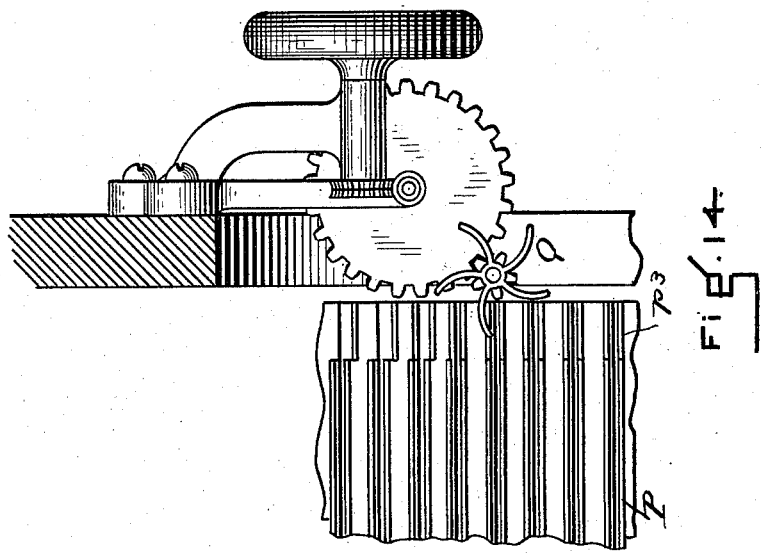
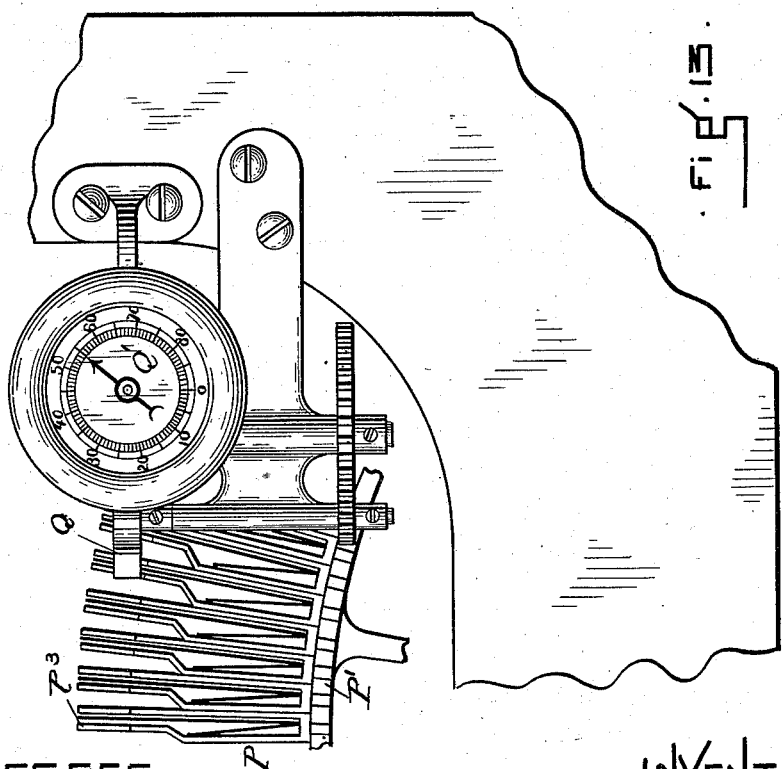

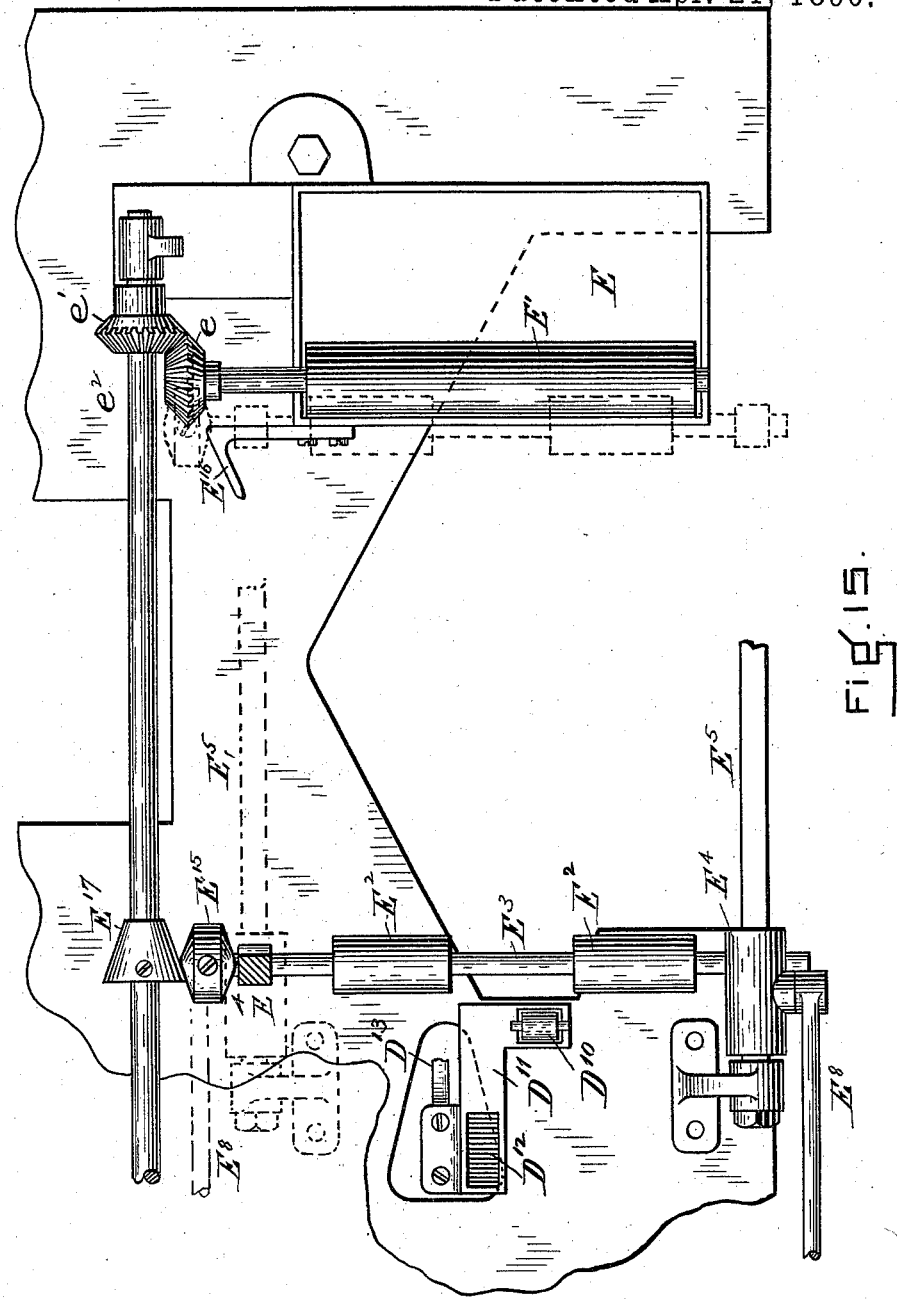

(No Model.) 13 Sheets—Sheet 13.
J. DENNIS, W. S. METCALFE & J. A. SHERMAN.
ENVELOP MACHINE.

No. 558,784. Patented Apr. 21, 1896.

WITNESSES
Frank G. Parker
Eva A. Guild

INVENTORS.

UNITED STATES PATENT OFFICE.

JOSEPH DENNIS, WILLIAM S. METCALFE, AND JOHN AMES SHERMAN, OF WORCESTER, MASSACHUSETTS.

ENVELOP-MACHINE.

SPECIFICATION forming part of Letters Patent No. 558,784, dated April 21, 1896.

Application filed July 8, 1893. Serial No. 479,895. (No model.)

*To all whom it may concern:*

Be it known that we, JOSEPH DENNIS, WILLIAM S. METCALFE, and JOHN AMES SHERMAN, of Worcester, in the county of Worcester and State of Massachusetts, have invented a new and useful Improvement in Envelop-Machines, of which the following is a specification.

Our invention relates to an improved envelop-machine which is more compact in construction than any heretofore made, and which, because the envelop during the process of manufacture is required to travel a somewhat shorter distance than in any previous machine of which we have knowledge, can be speeded somewhat faster, and, as a whole, can be operated more economically and with better results than any machine heretofore known to us.

To this end our invention consists, mainly, in certain details of construction more fully described below, all of which combine to produce this desired result. These details relate, first, to the means for lifting the paper-elevator, so that the top blank will always be within reach of the picker, and for insuring the separation of the top blank when lifted by the picker from those under it; second, to the operation of the gum-roll, by means of which gum is carried from the gum-box to the picker, the gum-roll being carried from side to side in the usual way, but being timed to gum the picker during each movement, and being given a lateral motion on its axis whereby a fresh surface is presented to the pickers whether its motion be away from or toward the gum-box; third, to the carriage, which is made in two parts which move in unison, but which can be adjusted independently of each other, so as to compensate for any irregularity in the shape of a particular set of envelopblanks; fourth, to the folding-box, into which the blank is placed and folded, and by which the folded envelop is carried positively until forced therefrom by suitable means; fifth, to a conveyer, which receives the envelop from the folding-box, arranging it at a proper angle to the drier, and carries it and delivers it thereto; sixth, to means whereby the envelop is moved into the drier from this conveyer; seventh, to the peculiar form of receptacle in which the envelop is held while being dried and counted, and, eighth, to the means of withdrawing the envelops and keeping them in place until they are removed from the machine.

Our invention also consists in certain minor details of construction which will be particularly referred to below.

Figure 2:
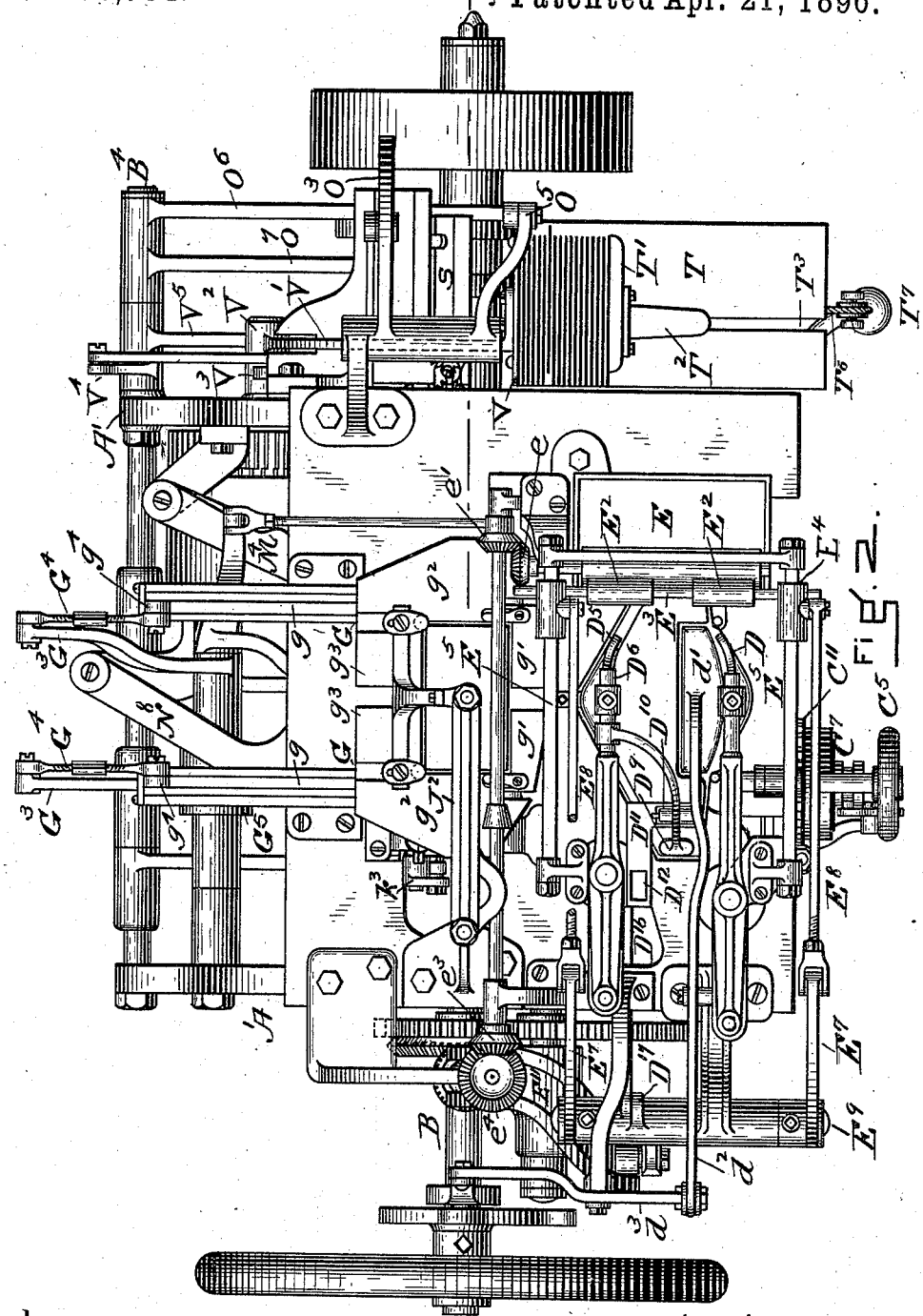
Figure 3:
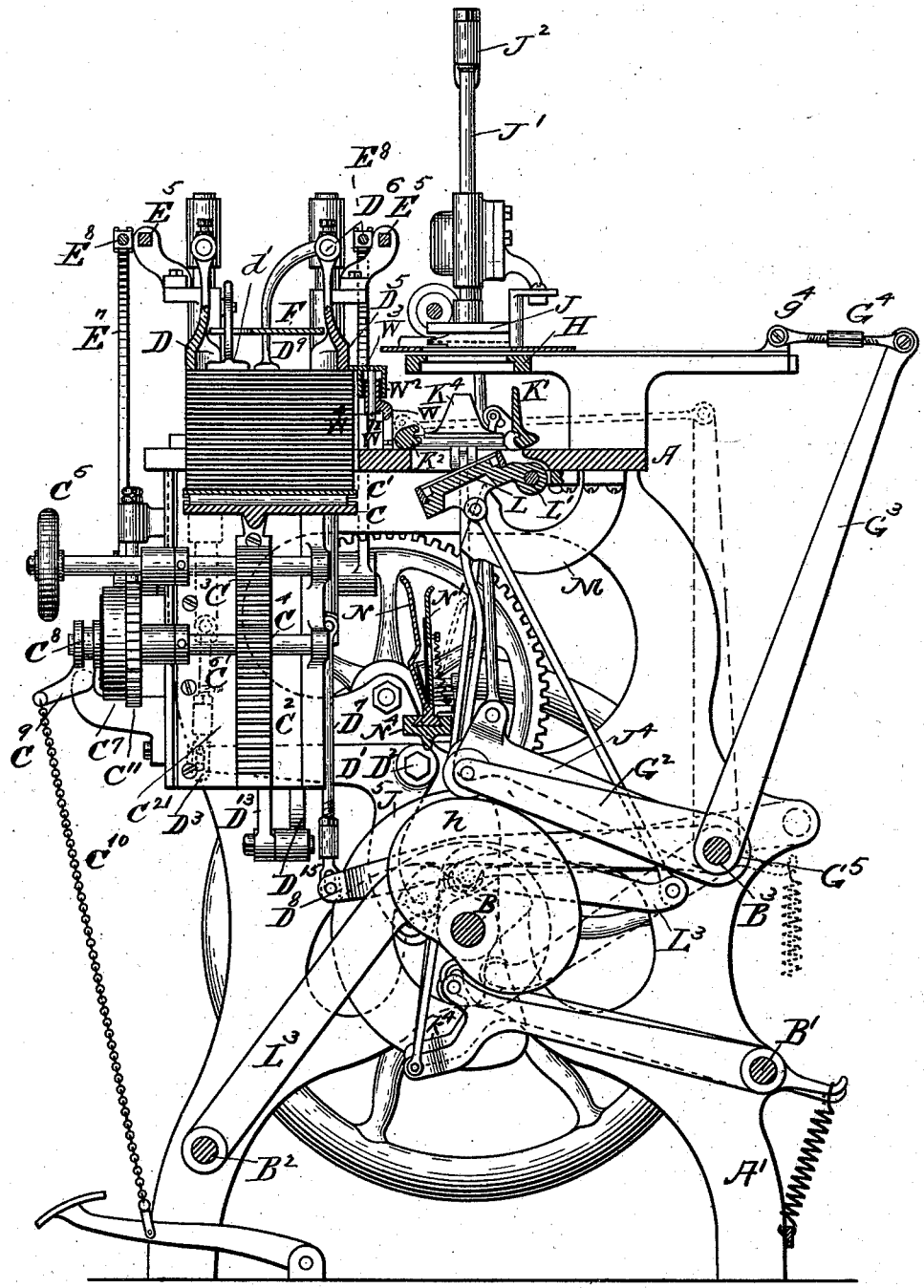
Figure 4:
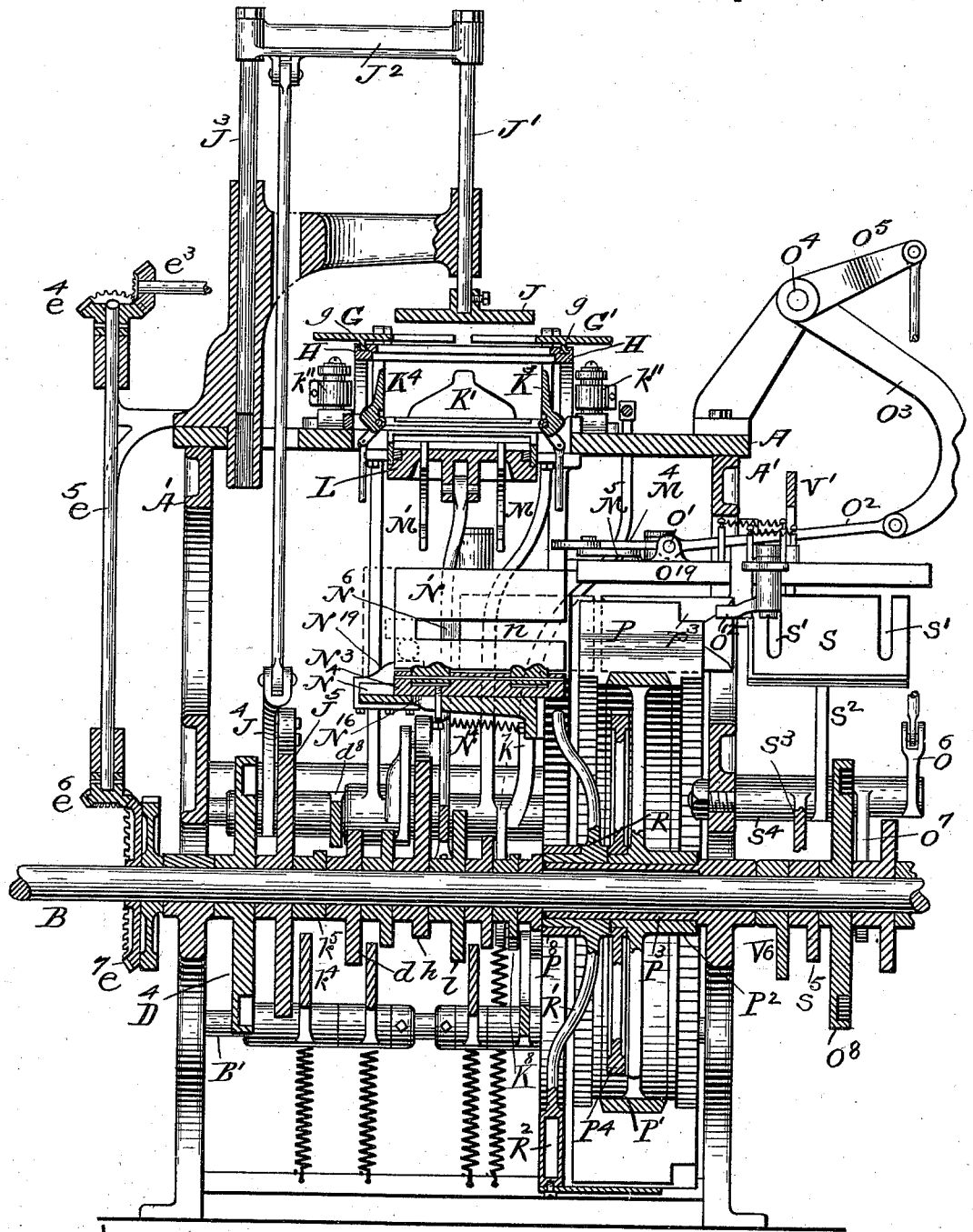
Figure 5:
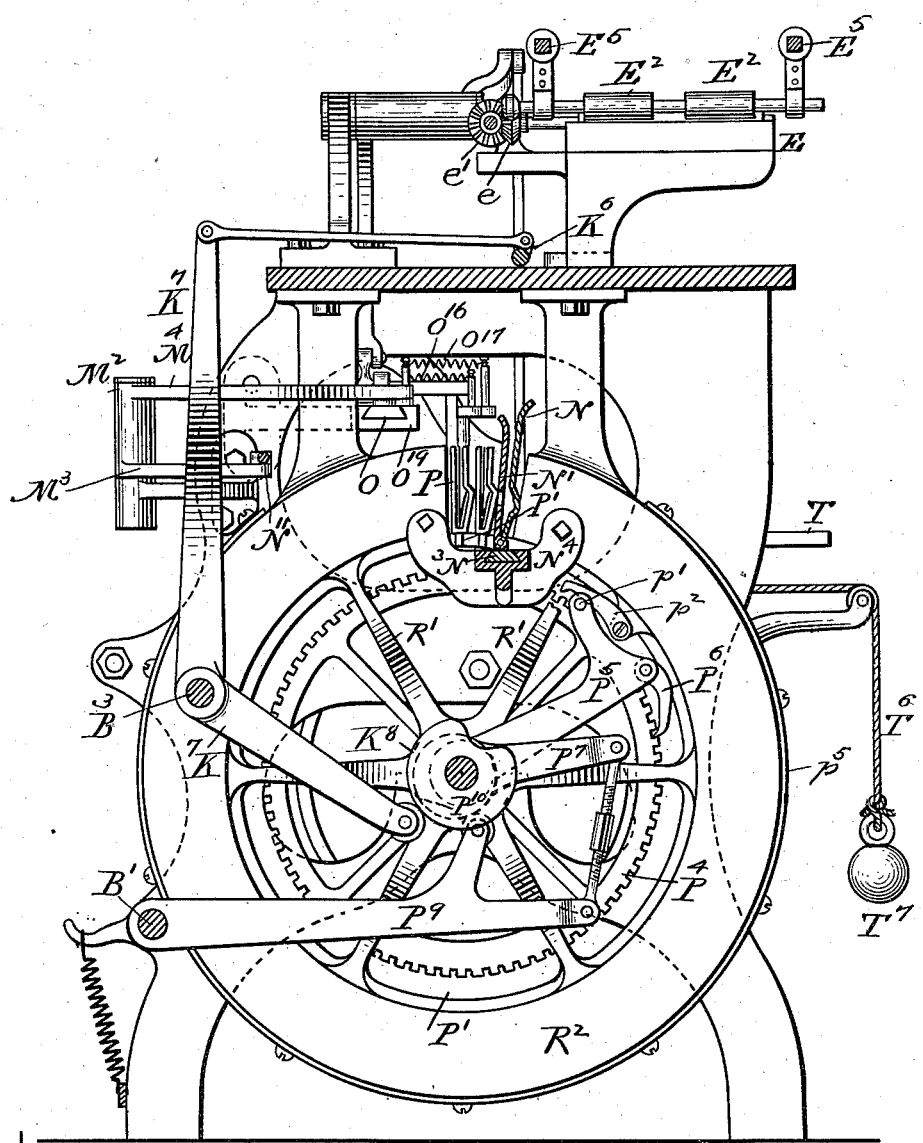
Figure 6:
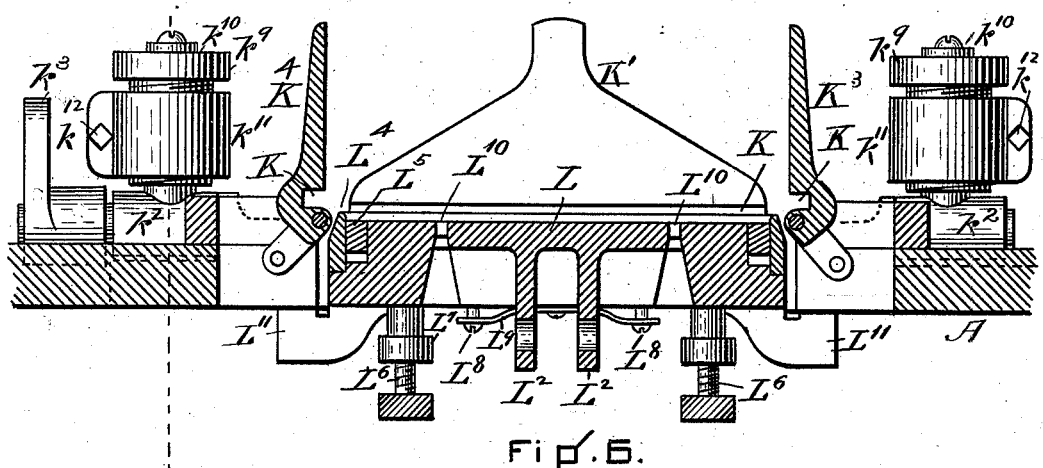
Figure 7:
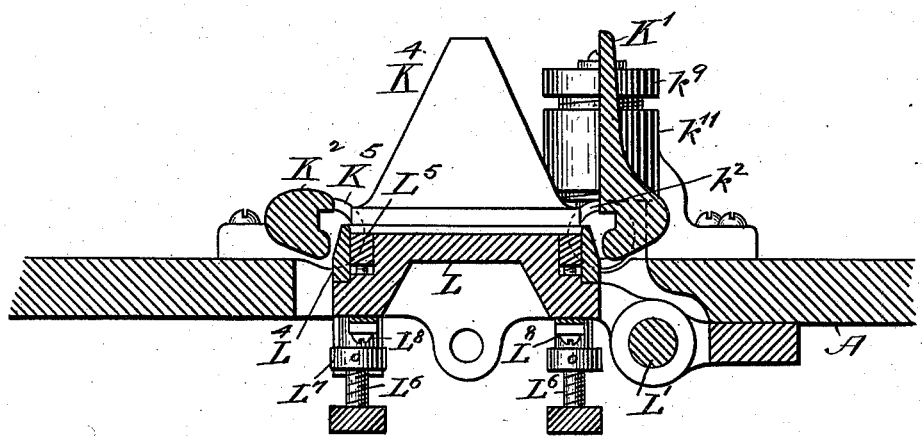
Figure 8:
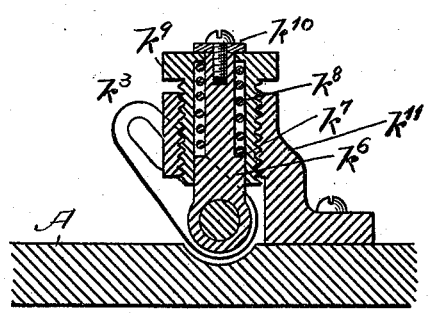
Figure 10:
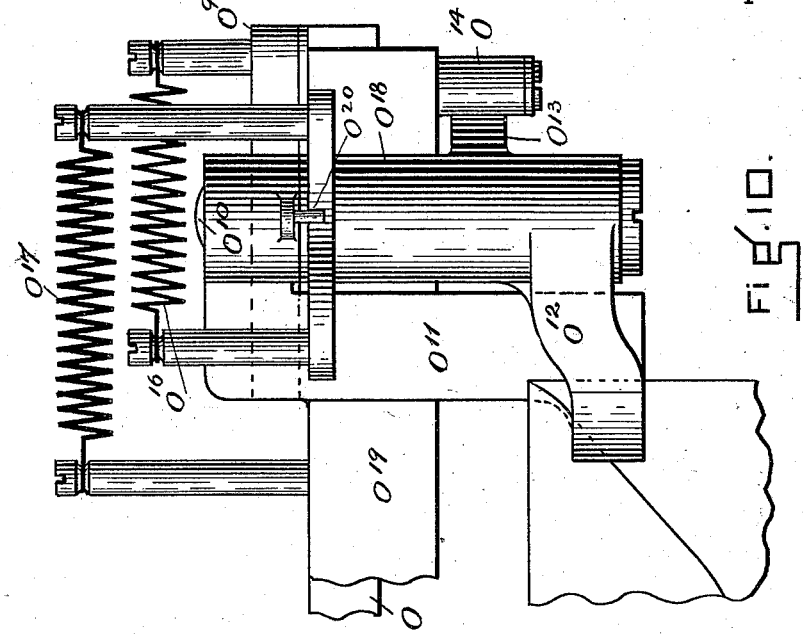
Figure 9:
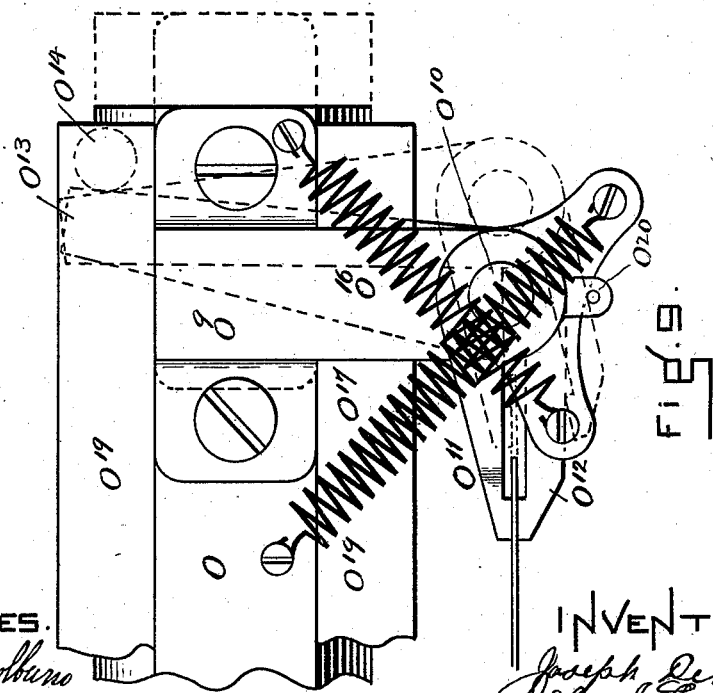
Figure 16:
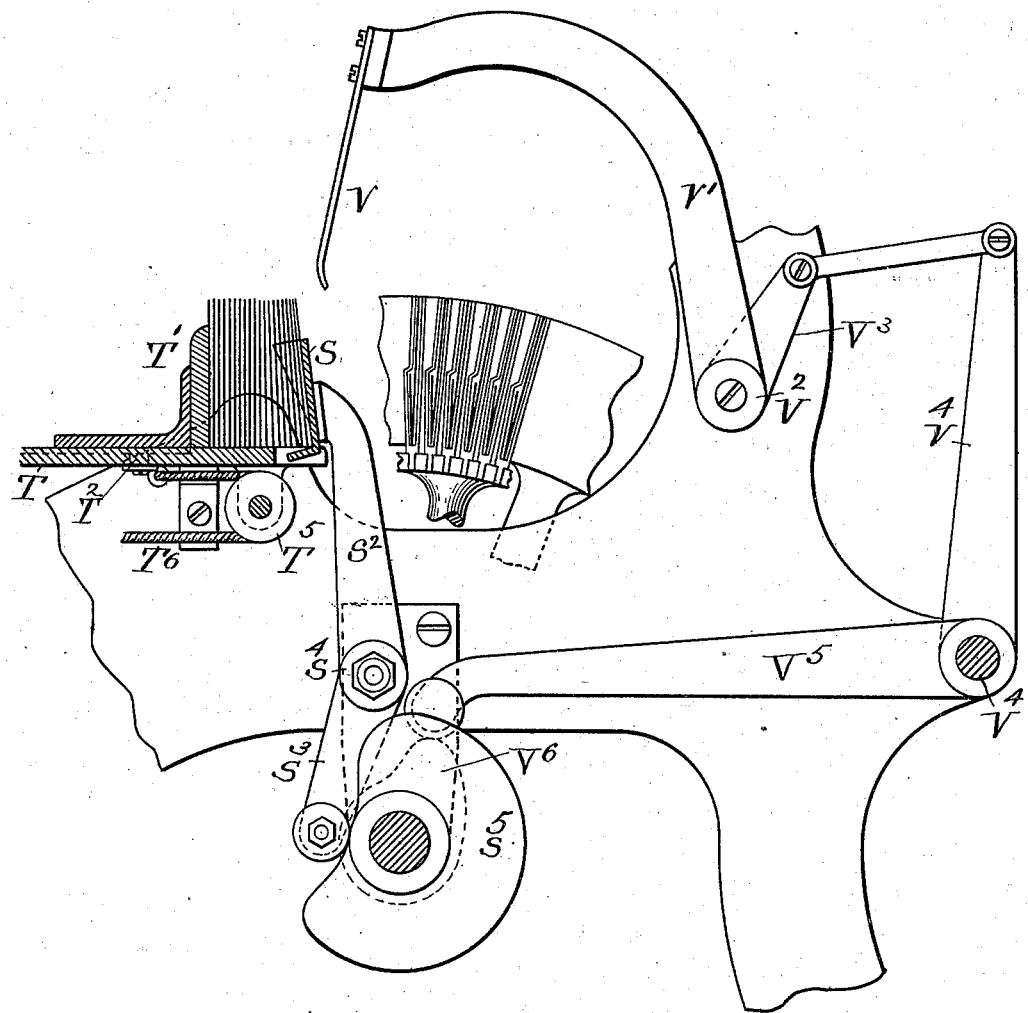
Figure 17:
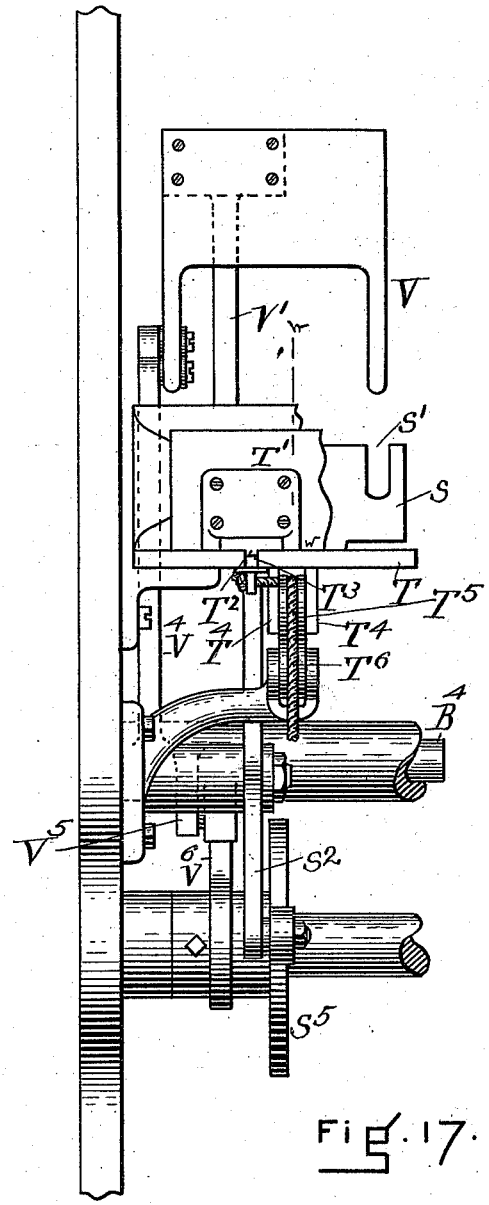

In the drawings, Figure 1 is a front elevation, Fig. 2 is a plan, and Fig. 3 a vertical section on line $x\ x$, Fig. 1, of a machine embodying our invention. Fig. 4 is a vertical section taken on the line $y\ y$ of the cam-shaft in Fig. 2. Fig. 5 is a vertical cross-section on line $z\ z$, Fig. 1, of the machine, showing more especially the location of the drier and the means by which the envelop is placed therein. Figs. 6, 7, and 8 are details of the folding-box. Figs. 9 and 10 show details of the mechanism for withdrawing the envelop from the drier, Fig. 11 showing in addition the mechanism for putting the envelop into the drier. Fig. 12 shows the conveyer in detail, Figs. 13 and 14, the counting mechanism, and Fig. 15 the mechanism by which the picker is gummed Figs. 16 and 17 are details, Fig. 16 being partly in section on line $w\ w$ of Fig. 17, showing the bunching mechanism.

A is the table, mounted on legs A′, and forming with them the frame of the machine, in which is journaled the cam-shaft B.

B′ B² are girths, which serve to steady the table and also as bearings for certain levers described below.

B³ B⁴ are studs, which also furnish bearings for levers.

In the operation of making envelops the blanks are placed on a paper-elevator, and the first step is to feed the blanks to the picker, by means of which the blanks are gummed and carried to the folding mechanism.

C is a paper-elevator on which the blanks are laid. We prefer to provide this paper-elevator with a tilting table C′ of a kind well known, so that the pile of blanks will yield slightly when struck by the picker and adjust itself to the level of the bottom of the picker.

The paper-elevator is supported on a rack C², in which run two pinions C³ C⁴, each mounted on a shaft suitably journaled in a hanger $C^{21}$ below the table. The shaft carrying the pinion $C^3$ has a hand-wheel, by means of which the position of the paper-elevator may be adjusted in either direction by hand.

The shaft $C^6$, on which the pinion $C^4$ is mounted, carries a portion $C^7$ of a friction-clutch, keyed thereto and adapted to slide thereon in line with the axis of the shaft, but to rotate therewith. $C^7$ is provided with a groove $C^8$, in which runs a pin attached to a bell-crank lever $C^9$, operated by the chain $C^{10}$ and its treadle, (see Fig. 3,) the purpose of this treadle being to separate the parts of the friction-clutch by means of the bell-crank $C^9$ and allow the paper-elevator to fall when a new supply of blanks is to be inserted. $C^{11}$ is a ratchet which forms the other member of the friction-clutch. It runs loosely on the shaft $C^6$. This ratchet is moved by the pawl $C^{13}$, and when engaged with the other part $C^7$ of the friction-clutch causes it and the shaft $C^6$ to be turned.

$C^{12}$ is a retaining-pawl.

The pawl $C^{13}$ is mounted upon a rod $C^{14}$, free to reciprocate, and is held in place by the spring $C^{18}$.

$C^{15}$ is a sleeve mounted on an arm $C^{16}$, carried by the rod $C^{17}$. This sleeve slides upon the rod $C^{14}$. The rod $C^{14}$ is provided with a shoulder $C^{19}$ near its lower end and with a check-nut $C^{20}$ suitably located higher up, and the construction of these parts is such that as the gummer D, which is connected with the rod $C^{17}$, vibrates, the sleeve $C^{15}$ slides up and down upon the rod $C^{14}$. As the pile of blanks is diminished the stroke of the gummer and of the sleeve $C^{15}$ lengthens, so that the sleeve begins to strike the shoulder $C^{19}$. This causes the rod $C^{14}$ to move down a little farther at each stroke, carrying the pawl with it, so that finally the pawl drops under the tooth over which it has been riding. When the sleeve next rises, it strikes the check-nut $C^{20}$ and lifts the rod $C^{14}$, so that the ratchet is turned one tooth, turning the pinion $C^4$ a corresponding distance, and the paper-elevator is raised slightly. The paper-elevator slides in ways in the hanger $C^{21}$, above referred to, in a manner well known.

The means above described for moving the paper-elevator is an important feature of our invention. It will be noticed that the shaft which carries the pinion $C^4$ is entirely distinct from the shaft $C^3$, which carries the hand-wheel $C^5$, and this we find of great practical value, as it enables the hand-wheel to be more conveniently located and the friction-clutch to be more easy of access.

The fly-flap gummer D is mounted on a cross-bar connected to the rod $C^{17}$ and is reciprocated vertically by means of the cam $D^4$, connection being made with that cam by means of the lever $D'$, mounted on the stud $D^2$, these two parts being held together by a slotted link $D^3$ and spring (not shown) arranged in a way well known to allow the stroke of the gummer to vary according to the varying height of the envelop-blanks.

The sticking-picker $D^5$ is mounted on a cross-bar $D^6$, which is reciprocated vertically by means of the cam $d$, to which it is connected by the rod $D^7$ and lever $D^8$, mounted on the stud $B^3$. The rod $D^7$ and lever $D^8$ are connected by slotted link and spring in the manner above described.

$D^9$ is a small picker for sticking the side flap of the envelop. It is mounted on the cross-bar $D^6$ and is gummed by its own gum-roll $D^{10}$, rotating in the covered box $D^{11}$, $D^{12}$ being an opening by means of which the box may be filled. (See Fig. 15.) This gum-box is also of our invention. It is secured to a vibrating lever $D^{13}$, having its fulcrum $D^{14}$ in a hanger $D^{15}$, attached to the lower end of paper-elevator hanger $C^{21}$. The lever $D^{13}$ is connected by means of a link $D^{16}$ with a vibrating arm $D^{17}$ on the stud $E^9$. This arm is mounted on a sleeve on said stud, which sleeve also carries the arm $D^{18}$, which is connected with and operated by the cam $E^{11}$. This cam is mounted on a sleeve on the stud $E^{12}$. The sleeve also carries the large gear $E^{13}$, which gets its motion from the gear $E^{14}$, having half the number of teeth and mounted on the cam-shaft B. Consequently this cam $E^{11}$ moves half as fast as the other parts of the machine and gives a corresponding motion to the parts connected with it. These parts are the small gum-box above referred to and also the large gumming-rolls $E^2$ $E^2$, by means of which the gummer and picker are gummed in the manner now to be described.

The gum-box E is suitably mounted on the table A. $E'$ is a gum-roll mounted therein in the usual manner on a shaft having a beveled gear $e$, which gets its motion from the beveled gear $e^7$ on the cam-shaft, by means of the gear $e'$, shaft $e^2$, gears $e^3$ $e^4$, shaft $e^5$, and gear $e^6$. Suitable means are provided for keeping the gum on the gum-roll in proper condition.

The gumming-rolls $E^2$ $E^2$ are mounted on a shaft $E^3$. One gumming-roll is located in line with the gummer and one with the picker. The shaft $E^3$ is journaled in slides $E^4$, running on ways $E^5$. These slides are connected by connecting-rods $E^8$ with rocker-arms $E^7$, mounted on the stud $E^9$, and are operated by the zigzag cam $E^{11}$. Thus the gumming-rolls and the small gum-box are moved in unison across the machine while the picker and gummer are up, and remain on the farther side of the machine while the picker and gummer descend and rise again, when they return to the side from which they started. The rolls $E^2$ $E^2$ are so located that while reciprocating they gum the gummer and picker during each passage across the machine. It is best under these conditions that a fresh portion of the gumming-rolls come in contact with the picker and gummer each time they are gummed, and for this purpose the shaft $E^3$ is given an end movement in its bearings. It carries a cam E$^{15}$, so placed that at each end of the stroke of the gumming-rolls it will strike one of the cam-surfaces E$^{16}$ E$^{17}$, which will press it either to one side or the other, as the case may be. When the rolls E$^2$ are in contact with the gum-roll E', the cam E$^{15}$ is in contact with the surface E$^{16}$ and the gumming-rolls are in the position shown in dotted lines in Fig. 15. When the rolls cross the machine, the cam E$^{15}$ comes in contact with the surface E$^{16}$ and throws the shaft so that the rolls lie in position shown in full lines in Fig. 15 and a fresh surface will come in contact with the picker and gummer and gum them. By means of this mechanism it is evident that the production of the machine will be greatly increased.

It will be noticed that the cam E$^{15}$ and cam-surfaces E$^{16}$ E$^{17}$ are all placed on the rear side of the gumming mechanism. This enables the operator to easily watch the operation of those parts.

To assist in lifting the paper in the best manner possible we have provided a movable take-off, which is marked $d'$. It is mounted on the end of an arm $d^2$, connected with the lever $d^3$, and operated by a cam, so as to have a motion similar to that of the fly-flap gummer.

The operation of these parts is as follows: The fly-flap gummer, the picker, and the movable take-off descend at substantially the same instant, and immediately after striking the paper the gummer starts up. The movable take-off, which lies right next to it on the paper, prevents the paper from sticking to the gummer. Immediately thereafter the take-off begins to rise and at about the same instant the picker, so that the paper is lifted by the picker alone.

We prefer to use with our machine a separator of the kind shown in Fig. 3, in which W is a stand carrying a sleeve having a vertical opening square in cross-section, in which slides a rod W', also square in cross-section, having supported on its upper end a hood W$^2$, carrying the separating-point W$^3$.

W$^4$ is a pin to prevent the rod W' from being raised too high. The hood W$^2$ is of great advantage, as it prevents any gum from reaching the moving parts, and moreover as it fits fairly closely to the outside of the sleeve it serves as an additional bearing to insure the steady vertical movement of the separator. In this it differs from all other separators of which we have knowledge, in which there is but one such bearing, the separator-support sliding in a sleeve or socket the interior of which is apt to wear with constant use, so that the movement of the separator becomes irregular.

The blank having been lifted is withdrawn from the picker by means of the stationary take-off F, which lies just above the path of the carrier.

The carriage consists of two separate parts or carriers G G', each adapted to hold one side of the envelop-blank. The two carriers G G' consist of slides $g$, which slide in grooves in the upper surface of the creasing-frame H, (see Figs. 2 and 4,) and on each of which is mounted a plate forming wings $g'$ $g^2$ $g^3$, the construction of each side of the carriage being the converse of the construction of the other. These wings are arranged, as shown in Fig. 2, to support the four flaps of the envelop and leave an opening through which the plunger may descend.

The carriers are given a motion in unison from a cam $h$ by means of the arm G$^2$, mounted on the sleeve G$^5$ on the stud B$^3$. This sleeve has two arms G$^3$ projecting from it, each connected with a slide $g$ by means of the link G$^4$ and ear $g^4$. The two carriers therefore operate together, but the position of each can be adjusted independently of the other by means of a turnbuckle in the link G$^4$. (See Fig. 3.) This is the main advantage of this construction, for by means of these turnbuckles the position of either side may be easily and simply altered to distribute about the four corners of a blank any irregularity in its shape without changing the position of the dogs on the carriage, as has heretofore been necessary. The carriers are provided with the usual means for carrying the blank under the plunger and holding it in place while the plunger descends and forces it through the creasing-frame.

The creasing-frame H is supported on the table A by suitable means. The plunger J is secured to a rod J', which is suspended by a cross-head J$^2$, guided by a rod J$^3$, these rods running through suitable sleeves in the usual manner. The plunger is operated from a cam J$^5$ by means of the cam-lever J$^4$, fulcrumed on the stud B$^3$ and connected with the cross-head J$^2$ by suitable link. (See Fig. 4.)

The folding mechanism consists of a presser-folder K', the fly-flap folder K$^2$, and the right and left hand folders K$^3$ K$^4$, respectively. The pressure-folder K' is journaled in boxes $k^2$, and on the extension of one end of its shaft is mounted a crank-lever $k^3$, which is connected with the cam-lever $k^4$ by a suitable connection fulcrumed on the stud B' and operated by the cam $k^5$. The journals of the fly-flap folder are marked K$^5$, and this folder is operated by a crank K$^6$ and link and bell-crank-lever K$^7$ from the cam K$^8$. The side-folders are operated in a similar and well-known manner and are of the usual construction, except that each is provided with a groove K, suitably shaped to fit over the rim L$^4$ of the folding-box.

The journal-boxes in which the pressure-folder is mounted are each provided with a stud $k^6$, having a shoulder $k^7$, which furnishes a support for the lower end of a spring $k^8$. $k^9$ is a hood or cap which confines the other end of the spring. The stud passes up through it, and it is held onto the stud by a screw and washer $k^{10}$. The outer surface of this hood is threaded, as shown, (see Fig. 8,) and the whole is supported in a split stand $k^{11}$, which is threaded in its interior, so that the hood $k^9$ can be screwed down into it. By means of these hoods the axes of the folders can be raised or lowered to adjust the folders to the thickness of the paper, and incidentally the pressure of the folders on the paper is adjusted to a certain degree because when the extremity or point of the folder is down upon the paper if the paper is thick any further movement of the folder about its axis tends to lift the axis against the force of the springs $k^8$, so that, in fact, the thicker the paper the more strength is exerted by the springs $k^8$ to fold it, provided the folders are properly adjusted.

$k^{12}$ is a set-screw by means of which the two parts of the split stand may be tightened together, so as to bind against the outer surface of the hood $k^9$ and keep it in place. By this means the position of the pressure-folder may be so adjusted that the jarring of the machine will not loosen it.

The folding-box is marked L. It is a swinging box hinged at L' to the under side of the table A. On the under side of this box are ears $L^2$, by means of which it is connected by a suitable connecting-rod to the arm $L^3$, which is hung on the girth $B^2$ and operated from the cam $l$. (See Fig. 3.) This box L has a rectangular rim $L^4$ projecting therefrom, so as to form a shallow recess into which the envelop is folded. The edge of the rim is shaped to fit the groove K in the folders and is curved or beveled slightly to allow the folders to turn over it. Inside of this rim $L^4$ is a second rim $L^5$, which is set by set-screws $L^6$, upon which the rim $L^5$ rests. The rim is held against the ends of these screws $L^6$ by means of other screws $L^8$, which pass up loosely through the part L and are fastened to the rim $L^5$, so that they move with it. Under the heads of each of these screws is a spring $L^9$, the tendency of which is to keep the rim $L^5$ in as low a position as the position of the adjusting-screws $L^6$ will permit. By means of the adjusting-screws $L^6$ the position of the rim $L^5$ may be so adjusted that the folders will fold either halves or quarters.

Attached to the box are stops $L^{11}$, which bear upon the under surface of the table when the box is in position.

The folding-box L is provided with slots $L^{10}$ and turns on hinges L'. As it falls, the extracting-forks M M' pass up into the box and force the envelop out. These forks M M' are attached to the under side of the table A. (See Fig. 3.) After it has been ejected from the folding-box the envelop drops into a conveyer, by which it is not only carried toward the drier, but its position is altered, so that it will lie in line with the particular holder in which it is to be placed, this conveyer registering with one of the holders in the drier. This conveyer consists of a pair of substantially vertical wings N N', one of which, N, is stationary while the other, N', is hinged at $N^2$ and is slotted at $n$. (See Fig. 12.) These wings are mounted upon a slide $N^3$, which moves in ways $N^4$, secured to the air-chamber $R^2$ of the drier. The envelop is moved into the drier by finger $N^6$, lying in slot $n$ and mounted on a striker $N^7$, which is carried by a lever $N^8$, fulcrumed at $N^9$ on the arm $N^{10}$. This lever $N^8$ gets its motion from the lever $M^3$, mounted on a sleeve $M^2$, the two levers being connected by the link $N^{11}$. The sleeve $M^2$ is moved in a manner described below. While the envelop is being carried into the drier the striker $N^7$ and stop $N^{13}$ are kept together by means of the spring $N^{14}$, (see Fig. 4,) this spring being secured to the air-chamber $R^2$ of the drier and to the under part of the slide $N^3$, as there shown. The ways $N^4$ are provided with a slot $N^{16}$, as shown in Fig. 4, and in this slot moves a pin which projects down from the under side of the slide $N^3$, the purpose of this pin and slot being to limit the motion of the conveyer toward the drier. As the lever $N^8$ moves, the finger $N^6$, as above described, releases the slide $N^3$, so that it may be drawn by the spring the length of the slot. The finger $N^6$, however, continues its movement, carrying the envelop toward and into the drier. In the meantime, however, the hinged wing N' of the conveyer must be closed in order to direct the envelop properly toward the holder in the drier which is to receive it. For this purpose the wing N' has a projection carrying a cam-roll $N^{18}$, which rides on an inclined track or cam $N^{19}$, secured to the under side of the ways $N^4$. The wing is held taut against its inclined plane by the spring $N^{20}$, so that when the movement toward the drier commences the spring $N^{14}$ in pulling the conveyer also acts to close the wing N' by causing the cam-roll $N^{18}$ to ride up the inclined plane.

The striker $N^7$ in its return motion strikes the stop $N^{13}$, and by means of it withdraws the conveyer. The spring $N^{20}$ at the same time opens the conveyer again as fast as the inclined plane $N^{19}$ will allow.

The sleeve $M^2$ carries an arm $M^4$, connected by a link $M^5$, pivoted thereto at $M^6$ to the slide O at $M^7$. This slide has an ear O', to which is attached a connection $O^2$, running to the rocker-arm $O^3$ mounted on the sleeve $O^4$. An arm $O^5$ mounted on this sleeve is connected by suitable connection with the cam-lever $O^6$ mounted on the stud $B^4$, the lower arm $O^7$ of this lever reaching to the cam $O^8$. The slide O also carries a pair of nippers to withdraw the envelop from the drier.

$O^9$ is a nipper-stand carrying a stud $O^{10}$.

$O^{11}$ is a stationary part forming one of the jaws, and $O^{12}$ is a movable jaw mounted on a sleeve $O^{18}$ on said stud. The sleeve $O^{18}$ has another arm $O^{13}$ attached to it, which engages with the stops $O^{14}$ and $O^{15}$ to move the jaw $O^{12}$, the opening of which is controlled by the pin $O^{20}$. This sleeve also has two projections, to each of which is attached one end of a spring, the other ends of these two springs being fastened to the slide O, these springs being lettered $O^{16}$ and $O^{17}$. The slide O moves in ways $O^{19}$, secured to one of the legs of the machine.

The operation of these parts is as follows: When the slide moves forward toward the drier, the nippers being open, the conveyer $N N'$ is moved back in position to receive the envelop from the folding-box. The slide having reached its most forward position, the arm $O^{13}$ strikes the stop $O^{15}$ and the nippers are closed on the envelop. The slide now starts back, pulling the conveyer at the same time through its various connections, thus feeding the dried envelop by means of the nippers out from the drier until the arm $O^{18}$ strikes the stop $O^{14}$, when the nippers are opened as far as the pin $O^{20}$ will allow and the envelop released. The springs $O^{16}$ and $O^{17}$ are so connected to the movable jaw of the nippers that one of them is always acting upon it. In Fig. 9 it will be noticed that $O^{16}$ keeps the jaw $O^{12}$ closed. When the arm $O^{13}$ is in the position shown in dotted lines in that figure, the jaw $O^{12}$ is opened, the spring $O^{16}$ will pull over the center of the stud, but the spring $O^{17}$ will then be pulling behind the axis of the jaw $O^{12}$ and keep it open.

The envelop after leaving the conveyer is placed in the envelop-holder P, which is secured to the drum $P'$ on the sleeve $P^2$. This sleeve is rotated intermittently, so as to rotate the drier on the bearing $P^3$, by means of the notched wheel $P^4$ and the pawl $P^6$. This pawl $P^6$ is mounted on the pawl-lever $P^5$, carried by the sleeve $P^8$. This sleeve $P^8$ also carries an arm $P^7$, suitably connected to the cam-lever $P^9$, mounted on the girth $B'$ and operated by the cam $P^{10}$. A holding-pawl $p^2$ is mounted on the under side of the air-chamber $R^2$, against the pin $p'$ on the short arm of the lever $P^5$.

The air-chamber $R^2$ is stationary. As shown, it is mounted on arms $R'$ extending from the hub R, which is mounted on one end of the bearing $P^3$ and carries also the sleeve $P^8$, above referred to. (See Fig. 4.) The air-chamber is also hung from the under side of the table and forms almost a complete circle to allow the envelop feeding and removing mechanism to operate. Properly-located openings receive the air from a suitable supply and convey it to the envelop-holders.

The drier itself carries a series of independent holders P, flaring at the mouth and notched at the rear end. (See Figs. 4, 11, and 14.) The notches are indicated at $p^3$ and are for the purposes, first, of enabling the nippers to get hold of the envelop when it is to be removed from the drier, (see Fig. 11,) and, second, of enabling the counting mechanism to act upon the envelop while it is in the drier. (See Figs. 13 and 14.) The front ends of these holders flare, as shown at $p^4$ in Fig. 11, so as to insure the proper feeding of the envelop into the holder. The holder is also provided with a space for holding the sealed flap of the envelop, as will be seen by reference to Fig. 5. Each holder is so constructed that it may be removed from the drier and a new one substituted without disturbing any other holder. The envelops are held in the drier by the guard $p^5$.

When the envelop has been placed in the drier and has made almost a complete revolution, it passes the turnstile Q of the counting mechanism. (See Figs. 13 and 14.) This turnstile Q operates a dial $Q'$ in the usual way; but the location of this turnstile so that the envelop will operate it while still held in the drier is of great value, because the envelop is then well supported between the walls of the holder and will certainly operate the turnstile. It will be seen that at this point the opposing walls of the holder are close together, thus forming a support for the envelop, so that they keep the envelop stiff and prevent it from buckling when it is acting on the turnstile, both walls of the holder thus coöperating with the turnstile to cause the counting operation to take place. Moreover the counting mechanism when thus located is more conveniently placed, being less in the way than if it is placed to operate during the passage of the envelop from the drier to the case.

After being removed from the drier by the nippers, which action takes place immediately after the envelop has been counted, it is placed upon the bunching-plate S, which is operated by the cam $S^5$, to which it is connected by the arm $S^2$, mounted on the sleeve $S^4$, which also carries the arm $S^3$, running to the cam $S^5$. This bunching-plate is provided with the slots $S'$ to allow the case-holding prongs V to operate. These prongs V are mounted on an arm $V'$, secured to the hub $V^2$, which also carries the arm $V^3$. The arm $V^3$ is connected by a link to one arm of the lever $V^4 V^5$, fulcrumed at $B^4$, this lever being operated by the cam $V^6$.

The case T for holding the finished envelops has an envelop-holder $T'$ slightly smaller than the envelop. This envelop-holder $T'$ has a projection $T^2$, running in a slot $T^3$ for the purpose of keeping it at a right angle to the walls of the case. On the under side of the case T are ears $T^4$, which carry a roll $T^5$, over which runs a cord $T^6$, connected at one end to the projection $T^2$ and at the other end to a weight $T^7$, thus holding the envelop securely against the prongs V and the bunching-plate. This case T and the various mechanisms just above described will be fully understood by reference to Figs. 1, 2, 4, and 5.

When a fresh envelop is to be put into the case, the prongs V are moved out of the way as the bunching-plate carrying the envelop approaches. When the bunching-plate has put the new envelop in place against the other envelops in the case, the prongs move down, so as to hold the line of envelops against the force of the envelop-holder and its weight $T^7$, and the bunching-plate moves away, the slots $S'$ allowing it to pass the prongs.

The operation of our machine is as follows:

The paper-board being down and the machine being at rest with the picker and gummer up, a pile of blanks is placed on the paper-board and the paper-board is thereupon lifted by hand, by means of the hand-wheel or automatically, to a point where the top blank shall be within reach of the picker. The machine being started up, the gumming-rolls $E^2$ $E^2$ move across under the picker and gummer, so that they will be gummed, and at the end of their motion the cam $E^{15}$ strikes one of the cam-surfaces, which throws the shaft $E^3$ to one side. The gumming-rolls then remain stationary until the picker and gummer have completed one operation. The picker and gummer, having been gummed, descend, and, striking the upper surface of the top blank, gum it. At the same time the movable take-off has moved down, so as to hold the blank alongside of the gummer. The gummer now starts upward and the blank is pulled off from it by the movable take-off, which for the instant remains stationary. Immediately thereafter the picker starts upward, carrying the rear end of the blank with it, the movable take-off also starting and getting out of the way and rising to a level with the stationary take-off. The carriage during the first part of this operation has been under the plunger, but it comes forward in time to receive the blank, and on its return motion carries the blank under the plunger, which at this instant is up. The plunger now descends and forces the blank down through the creasing-frame into the box. The carriage now can start back to receive another blank because of its conformation, being made of two separate parts, so that it may travel past the plunger-rod. While this has been going on the gumming-rolls have traveled back to their original position, gumming the picker and gummer again, and they have started down to lift another blank. The blank which has been placed in the folding-box is folded by the folders, so that it lies in the recess which forms the folding-box. The box immediately swings down onto the forks, the prongs of which, coming up through the box as the box falls, forces the envelop, which is now completed, except for its drying, out of the box down into the conveyer. The box then rides up again, so as to be ready for the next envelop. The conveyer, having received the envelop, starts forward toward the drier and is closed, so as to make the envelop lie in line with the position it will assume in the drier. When it has reached the edge of the drier it stops, and the finger puts the envelop in the drier. The drier immediately takes one step to present a new pocket to the conveyer, and the conveyer and its finger being immediately thrown back into their original positions are now ready to receive the next envelop. The drier proceeds step by step until the pocket which received the first envelop has made nearly a complete revolution, when it strikes the turnstile and thereafter stands within reach of the nippers, which come forward and grip the envelop, pulling it out of the drier onto the bunching-plate, which throws it up into the case. This operation continues without change until the supply of blanks has been lowered a certain prearranged amount, when the picker at its lowest stroke strikes the shoulder on the pawl-carrying rod and depresses the pawl sufficiently to bring it under the ratchet-tooth $m$, on which it has been riding. On its next upward motion the picker strikes the check-nuts at the top of the pawl-carrying rod, and consequently gives the ratchet a turn and lifts the paper-board to its uppermost position. By this means the top blank of the pile is kept at substantially the same level at all times.

What we claim as our invention is—

1. In an envelop-machine of the kind described, in combination with a vertically-reciprocating gummer and mechanism whereby it is reciprocated, a paper-elevator and mechanism whereby it is lifted, consisting of a movable rod carrying stops and suitably connected with said elevator, and a sleeve located to reciprocate on said rod between said stops, said sleeve being connected with said gummer, all as set forth.

2. In an envelop-machine of the kind described, the blank-lifting mechanism above described consisting of a reciprocating fly-flap gummer and a reciprocating sticking picker, each mounted and operating independently of the other, and a reciprocating take-off adapted to be operated in the manner described to remain in contact with the blank until after the gummer has started up, and to rise before the picker has started up, as and for the purposes set forth.

3. In an envelop-machine of the kind described, the gumming mechanism consisting of the shaft carrying one or more gumming-rolls, said shaft being journaled in reciprocating slides and adapted to travel endwise therein and carrying a cam $E^{15}$ located at one end of said shaft, in combination with mechanism whereby said slides are reciprocated, and with the cam-surfaces $E^{16}$, $E^{17}$, whereby said shaft is caused to travel endwise, as and for the purposes set forth.

4. In an envelop-machine of the kind described, in combination with a suitable picker and plunger and means whereby they are reciprocated, the carriers above described, consisting of two separate parts G, G' adapted to be reciprocated in unison in the manner described, and each provided with wings to give support to the blank, and each adapted to be adjusted in position independently of the other, and mechanism whereby said carriers are reciprocated, all as and for the purposes set forth.

5. In an envelop-machine of the kind described, the oscillating recessed folding-box and means whereby it may be oscillated in combination with means substantially as described whereby the envelop is ejected therefrom at one extremity of its oscillation, all as and for the purposes set forth.

6. In an envelop-machine of the kind described, a folding-box consisting of a swinging piece recessed to receive, hold and carry in its recess a folded envelop, in combination with mechanism whereby the blank is placed and folded therein and carried to an ejector and ejected therefrom, all as and for the purposes set forth.

7. In an envelop-machine of the kind described, a recessed oscillating folding-box adapted to hold the folded envelop and slotted in the manner described, and means whereby it may be oscillated, in combination with a forked piece adapted to pass through said slots and eject said envelop, as set forth.

8. In an envelop-machine the folder above described provided with journals each being suitably mounted in a threaded hood whereby the axis of said folder may be adjusted, each hood being held by a threaded clamp, all as and for the purposes set forth.

9. In an envelop-machine of the kind described, a folding-box, a conveyer located below said folding-box to receive an envelop falling therefrom, one side or wing of said conveyer being stationary, and the other movable, and means whereby said movable wing is closed upon said stationary wing, whereby the line of movement of the envelop therefrom may be directed, as and for the purposes set forth.

10. In an envelop-machine of the kind described, in combination with a drier of the kind described a folding-box, a conveyer located to receive the folded envelop therefrom and means substantially as described whereby said conveyer is moved longitudinally toward the drier, in combination with a pusher adapted to move the envelop in the same direction into the drier, all as and for the purposes set forth.

11. In an envelop-machine of the kind described, a folding mechanism, a conveyer located to receive the folded envelop therefrom, a drier and means substantially as described whereby said conveyer is moved longitudinally toward the drier and at the same time closed, whereby the envelop is received from the folding-box and is caused to register with one of the pockets in the drier, all as set forth.

12. In an envelop-machine the drier above described having pockets open at each end, each pocket being a casting independent of every other pocket and independently separable from the drier, all as and for the purposes set forth.

13. In an envelop-machine a counting mechanism having a turnstile, in combination with a drier having a series of pockets, each adapted to hold an envelop while it is being dried, the opposing walls of a portion of each pocket being in close proximity, forming supporting-surfaces for the envelop and being notched as described, said turnstile being located in line with said notches and adapted to engage in turn with each envelop held between said supporting-surfaces, as the drier rotates, all as set forth.

14. In an envelop-machine of the kind described, the nippers shown adapted to withdraw the envelop from the drier, in combination with means whereby said nippers are reciprocated, said nippers consisting of a stationary and a movable jaw, said movable jaw being controlled by two springs arranged at substantially right angles to each other and adapted to pull on one side of the axis of said jaw when the jaw is open, and upon the other side of the axis of said jaw when the jaw is closed, all substantially as and for the purposes set forth.

15. In an envelop-machine, the mechanism above described whereby the freshly-folded envelop is dried and conveyed from the folding-box to the case, said mechanism consisting of a conveyer located below and in line with the folding-box, and means whereby said conveyer is reciprocated longitudinally and the position of the envelop in the conveyer changed therein, means whereby the envelop is moved therefrom into the drier, and a drier adapted to have an intermittent rotary motion and means whereby the envelop is withdrawn from the drier and placed upon the bunching-plate, all as set forth.

16. In an envelop-machine, in combination, a conveying mechanism and means whereby it is operated and adapted to convey the envelop received therein to the drier, a drying mechanism located with its axis parallel to the line of motion of the conveying mechanism, the pockets of said drier being each in turn presented to said conveying mechanism to receive the envelop therefrom, and means whereby said drying mechanism is rotated intermittently, a withdrawing mechanism adapted to withdraw each envelop in turn from the drier at the side opposite to that on which it entered the drier, and means whereby said withdrawing mechanism is operated and a bunching mechanism located to receive the envelop from said withdrawing mechanism, all substantially as above described, whereby the envelop is received by the conveyer, conveyed to and placed into the drier in a line with its axis and after the drying operation is completed, is withdrawn from the opposite side of the drier, all as set forth.

In witness whereof we have hereunto subscribed our names this 1st day of July, 1893.

JOSEPH DENNIS.
WILLIAM S. METCALFE.
JOHN AMES SHERMAN.

Witnesses:
BENJAMIN F. SOUTHWICK,
C. HERBERT COLBURN.